(12) United States Patent
Meesseman (10) Patent No.: US 7,974,946 B2
(45) Date of Patent: Jul. 5, 2011

(54) SYSTEM AND METHOD FOR SYNCHRONIZING PERSONAL DATA AMONG A PLURALITY OF DEVICES STORING SUCH DATA

(75) Inventor: Scott Meesseman, Warren, MI (US)

(73) Assignee: Alps Electric (North America), Inc., Auburn Hills, MI (US)

( * ) Notice: Subject to any disclaimer, the term of this patent is extended or adjusted under 35 U.S.C. 154(b) by 987 days.

(21) Appl. No.: 11/391,734

(22) Filed: Mar. 28, 2006

(65) Prior Publication Data

US 2007/0260751 A1 Nov. 8, 2007

(51) Int. Cl.
*G06F 17/30* (2006.01)
(52) U.S. Cl. .......................... 707/621; 707/624; 707/625
(58) Field of Classification Search ........... 707/200–204
See application file for complete search history.

(56) References Cited

U.S. PATENT DOCUMENTS

| | | | | |
|---|---|---|---|---|
| 7,334,726 B2 * | 2/2008 | Dulgerian et al. | ............ | 235/382 |
| 7,415,486 B2 * | 8/2008 | Multer | ............ | 707/201 |
| 2005/0055465 A1 * | 3/2005 | Sato | ............ | 709/248 |
| 2006/0074996 A1 * | 4/2006 | Corbett et al. | ............ | 707/201 |
| 2007/0016362 A1 * | 1/2007 | Nelson | ............ | 701/200 |
| 2007/0118577 A1 * | 5/2007 | East | ............ | 707/204 |

\* cited by examiner

*Primary Examiner* — Debbie Le
(74) *Attorney, Agent, or Firm* — Brinks Hofer Gilson & Lione (57) ABSTRACT

A system and method for maintaining data synchronization across a plurality of user devices is provided. The system and method manage data synchronization among a plurality of data storage devices includes a mobile personal information system adapted interface with a number of data storage devices. A personal information system supports multiple data synchronization protocols so that the personal information system may synchronize data with a wide range of different data storage devices. A synchronization arbitrator is associated with the personal information system. The synchronization arbitrator is adapted to register all of a user's personal devices which store the user's personal information. The synchronization arbitrator also initiates a data synchronization function with each registered data storage device, employing the synchronization protocol appropriate for each device. The personal information management system may comprise a vehicular mounted personal data storage system. The user devices may include a hand-held personal data storage system and a computer adapted to store personal data.

30 Claims, 6 Drawing Sheets

SYSTEM AND METHOD FOR SYNCHRONIZING PERSONAL DATA AMONG A PLURALITY OF DEVICES STORING SUCH DATA

FIELD OF THE INVENTION

The present invention relates to a system and method for maintaining data synchronization among a plurality of devices, each of which stores various personal data. For example, the system and method of the invention may be used to maintain data synchronization between a personal computer (PC), a personal information management system (PIM), and various hand-held devices such as a cell phone, personal digital assistant, or wireless e-mail terminal.

BACKGROUND

Personal Computers and portable electronic devices such as cell phones, personal digital assistants (PDAs), and wireless email terminals have become an indispensable part of everyday like for many people. It is not uncommon for individuals to employ multiple devices for managing their personal communications, schedules, address books, contact lists, task lists, and the like. Typically, each separate device will include provisions for storing data related to the primary functions of the device. For example, an individual may have both home and work computers that include software for managing a comprehensive set of personal data, including contact lists, addresses, an appointment calendar, task lists, personal notes and memos, and so forth. However, the user may have different software operating on is or her home computer from that running on his or her word computer. What is more, the individual may have different data stored on his or her home computer than that stored on his or her work computer. For example the individual's home computer may store contact information and task lists of a more personal or domestic nature, whereas the individual's work computer may store more professional or business related data. Nonetheless, there may be significant overlap between the data stored on both machines.

The same individual likely also carries a cell phone, wireless email terminal or some other mobile personal communications device. Most mobile communications devices include provisions for storing contact information related to contacting people using the device in question. For example cell phones typically include provisions for storing contact names and telephone numbers. Most wireless email terminals also function as cell phones and thus include provisions for storing contact names and both phone numbers and email addresses. Many individuals also carry separate personal digital assistants (PDAs). PDAs typically store contact information, address books calendars, task lists, memos, and other information.

With so many devices available to store personal data in so many locations, the typical user will have a great amount of personal data distributed across many devices. Problems often arise when data are stored in more than one location. Inconsistencies develop when data are added or modified in one location and the changes are not carried over to other devices storing the same or similar data. For example, suppose an individual has stored the name and phone number of a contact in his or her cell phone. Suppose further that the same contact information is stored on both the individual's home and work computers. Sometime after the individual has entered the contact information into his or her cell phone the individual learns that the contact's telephone number has changed. The user learns of this change while trying call to the contact on his or her cell phone. Since the user is using the cell phone to call the contact at the time he or she learns of the contact's new number, it is likely the user will update the appropriate record in his or her cell at that time. However, when the user updates the contact information in the cell phone he or she may not have access to his or her home or work computers. Therefore, the user cannot update the contact's information on his or her home and work computers at the same time he or she updates the cell phone record. By the time the user does again gain access to his or her home or work computers, the user may have forgotten about the updated contact information, and may fail to update the contact information on his or her home or work computers or on any of the other data storage devices that may hold the same information. If, at a later time the user tries to call the same contact from home or from work, using the contact data stored on his or her home or work computer, the retrieved phone number will be incorrect and the user may not be able to reach the contact unless or until he or she retrieves the updated number from his or her cell phone.

A contact's phone number is but one simple example of how data inconsistencies may arise between devices when the same personal data is distributed across multiple devices. Many other scenarios may be imagined in which data inconsistencies arise between different devices, especially when the number of different devices increases. In order to avoid data inconsistencies many hand-held data storage devices such as PDAs include provisions and for synchronizing data between the portable device and a host computer. In fact, a number of data synchronization protocols have been developed for performing data synchronization between various data storage devices. The particular synchronization protocol used to synchronize data between two devices will be a function of the devices themselves, the type of data being synchronized, and the type of interface between the devices. Examples of synchronization protocols currently in use include SyncML Remote Sync; SynML Local Sync; Bluetooth Synchronization (IRMC); and various device specific proprietary synchronization protocols.

It must be noted, that the synchronization protocols listed above are geared only toward synchronizing data between two devices. They do not provide a mechanism for synchronizing several devices either in parallel or sequentially. Some devices may support multiple sync protocols and may be adapted to sync with more than one device. Nonetheless, all such devices are adapted for synchronizing data between only two devices at any given time. In cases where an individual has more than two devices sharing common data, the two-way sync protocols currently available are insufficient to eliminate data inconsistencies between all of a user's devices.

When data can be added and modified on any one of a plurality of devices it is imperative that such additions and changes made on one device are propagated to the other user devices which store the same or related data. At present there is no system or mechanism available for maintaining the consistency or personal user information across a plurality of different devices.

SUMMARY OF THE INVENTION

The present invention provides a system and method for maintaining data synchronization across a plurality of user devices adapted to store personal information such as contact lists, telephone numbers, address books, email addresses, appointment calendars, task lists, memos, and the like. The system and method of the invention ensure that changes and additions to the data stored on one device are propagated and stored on all of the other devices on which the user stores the same or similar data.

According to an embodiment of the invention a system for managing data synchronization among a plurality of data storage devices includes a mobile personal information system adapted to interface with a number of data storage devices. The personal information system supports multiple data synchronization protocols so that the personal information system may synchronize data with a wide range of different data storage devices. A synchronization arbitrator is associated with the personal information system. The synchronization arbitrator is adapted to register all of a user's personal devices which store the user's personal information. Registering a device includes identifying the device as a device that stores personal data that must be synchronized with the system, and identifying the most appropriate protocol to use for carrying out the synchronization. The synchronization arbitrator also initiates a data synchronization process with each registered data storage device in each case the synchronization arbitrator employs the synchronization protocol appropriate for each device. The personal information management system may comprise a vehicular mounted personal data storage system. The user devices may include a hand-held device such as a cell phone, PDA, or wireless email terminal as well as one or more personal data storage system computers adapted to store personal data.

Another embodiment of the invention provides a method of maintaining consistent personal data across a plurality of devices adapted to store personal data. According to this embodiment a method of maintaining consistent data includes providing a synchronization arbitrator for managing the synchronization of data among multiple user devices which store a user's personal data. A plurality of user devices, those on which data consistency is to be maintained, are registered with the synchronization arbitrator. Registering the user devices includes identifying a synchronization protocol for synchronizing data between the synchronization arbitrator and each of the plurality of registered devices. Registering a device includes identifying the device as a device that stores personal data that must be synchronized with the stem, and identifying the most appropriate protocol to use for carrying out the synchronization. The method concludes by synchronizing data between the synchronization arbitrator and each of the registered devices. The synchronization protocol identified for each device during the registration process is used to perform the data synchronization with each particular device.

According to another embodiment a method of maintaining consistent data across a plurality of personal data storage devices also includes providing a synchronization arbitrator adapted to synchronize personal data among each of a plurality of user devices. According to this embodiment, data are synchronized between the synchronization arbitrator and a first device. The data synchronization process ensures that the personal data stored on both the first device and the synchronizing arbitrator are consistent. A first change log is maintained. The first change log records all of the changes made to the data stored by the synchronization arbitrator as a result of synchronization with the first device. Once the data synchronization between the synchronization arbitrator and the first device is complete the data between the synchronization arbitrator and a second device are synchronized so that personal data stored on both the second device and the synchronization arbitrator are consistent. Again, a change log is maintained of the changes necessary to synchronize the personal data between the synchronization arbitrator and the second device. When the data synchronization is complete the first and second change logs are compared to determine whether any of the changes necessary to synchronize the synchronization arbitrator with second device must be updated on the first device. If so, the synchronization arbitrator and the first device are synchronized a second time in order to ensure that the personal data stored on the synchronization arbitrator, the first device, and the second device remain consistent.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the appended claims.

DETAILED DESCRIPTION

The present invention provides a system and method for maintaining data synchronization across a plurality of user devices adapted to store some or all of a user's personal information. For purposes of the present description "personal information" relates to data that a user may enter into a user device for storage and later recall. For example, personal data may include contact lists, phone numbers, address books, email addresses, appointment calendars, task lists, notes, memos, alarms, and so forth.

Figure 1:
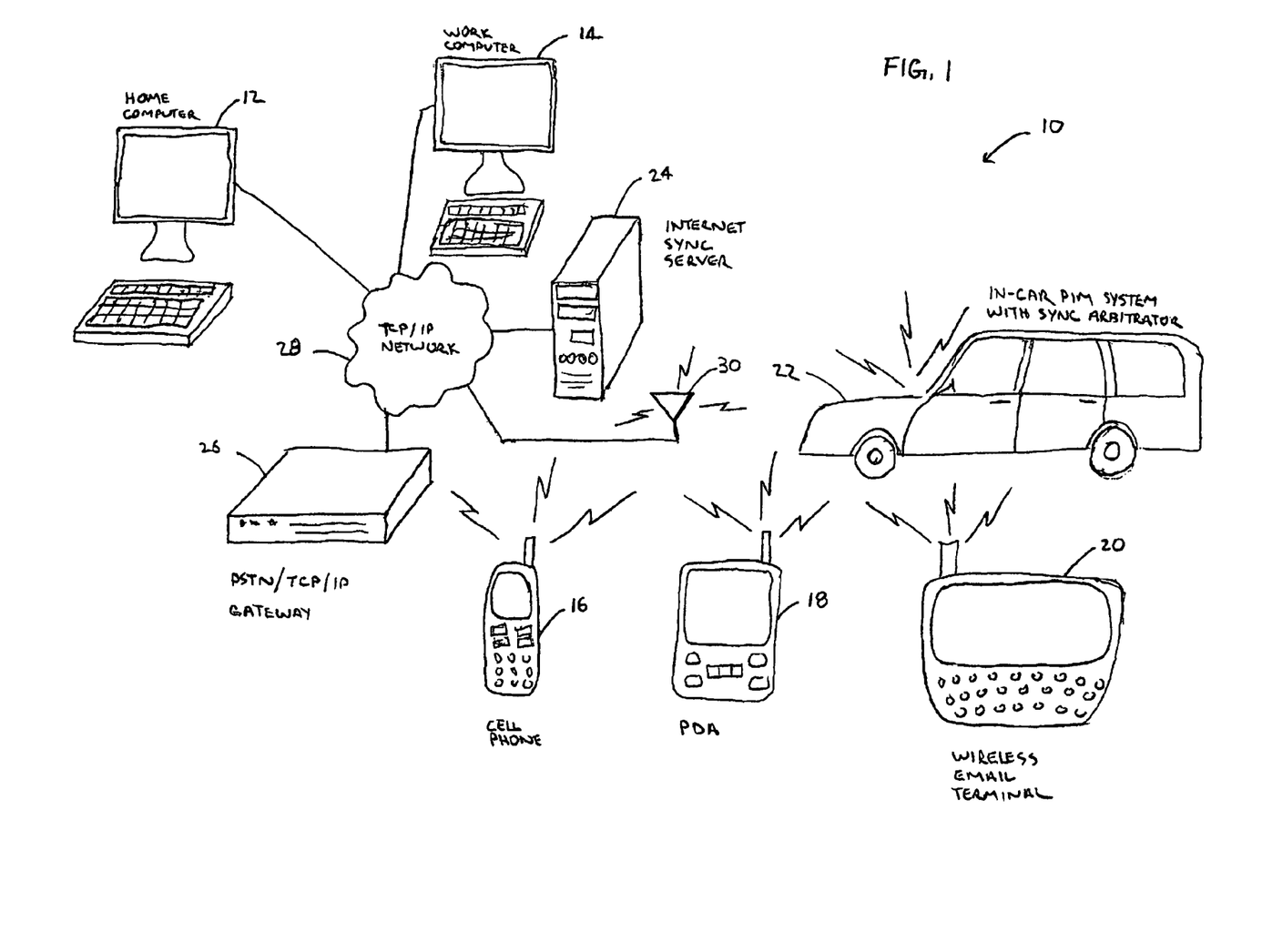
FIG. 1 is a diagram of an exemplary universe of user devices on which a user may have stored overlapping and redundant personal information.

FIG. 1 shows a sample universe of various user devices 10 on which a user may store some or all of his or her personal information. The user desires to maintain consistent data across all of the various devices. In the example shown in FIG. 1, the user has access to two separate computers, a home computer 12 and a work computer 14. Both the home and work computers 12, 14 are connected to a TCP/IP based network, such as the Internet. Both computers include personal management software that allows a user to store contact info, calendar information, task lists, personal memos, notes and so forth.

A synchronization server 24 is also connected to the TCP/IP network 28. The synchronization server 24 is provided for maintaining data consistency with both the home and work computers 12, 14. A TCP-IP gateway 26 provides dial-up telephone access to the TCP/IP network 28, and a Wi-Fi wireless network hub 30 or some other wireless network device provides direct wireless access to the TCP/IP network 28.

Additional user devices may include a cell phone 16, a personal digital assistant 18 and/or a wireless e-mail terminal 20. Typically a wireless e-mail terminal combines the functions of a cell phone and a PDA with the ability to send and receive e-mail wirelessly. Carrying/cell phone, a PDA and a wireless email terminal may appear to be redundant, however, for purposes of the present discussion, in order to illustrate the flexibility of the present method and system, we will assume that a hypothetical user carries all three devices. Finally, in this example the user also has a vehicle mounted personal information management system (PIM) 22. The vehicle mounted PIM 22 may perform many of the same functions as the information management software operating on the user's home and work computers 12, 14 or PDA 16, storing contact information, an address book an appointment calendar, task lists, and the like. The vehicle mounted PIM 22 may include provisions for displaying data and receiving commands through an interactive display mounted in the vehicle's control panel or some other interface mechanism, such as a speech dialog system, or the like. In an alternative arrangement a PIM system such as the vehicle mounted PIM system 22 may be located other than on a vehicle. Each of the home and work computers 12, 14, the synchronization server 24, the cell phone 16, the PDA 18, the wireless email terminal 20, and the vehicle mounted PIM 22 stores personal information which is at least partially repeated on one or more of the other devices.

In the example shown in FIG. 1 there are seven separate systems or devices capable of storing some or all of the user's personal information. Data synchronization must be maintained across all of the various devices. According to an embodiment of the invention, the vehicle mounted PIM system 22 forms the heart of a multi-device data synchronization system. In this embodiment the vehicle PIM system includes a synchronization arbitrator responsible for maintaining data synchronization between all of the user's different devices. In other words, the synchronization arbitrator maintains data synchronization between the vehicle PIM system 22 and the user's home computer 12, the user's work computer 14, the synchronization server 24, cell phone 16, PDA 18, and wireless e-mail terminal 20. As will be described in more detail below, the synchronization arbitrator comprises a software module adapted to be executed by a processing unit associated with the vehicle's PIM system 22. In alternative embodiments it may be desirable to include the synchronization arbitrator function elsewhere in the user's device environment. For example, the synchronization arbitrator function could be included in the user's home computer 12, work computer 14, or on some other user device if necessary.

In order to exchange and synchronize data, an interface must be established between the vehicle's PIM system 22 and the other user devices. For example, a Bluetooth wireless interface may be established between the vehicle PIM system 22 and portable hand-held devices such as the cell phone 16, PDA 18, and wireless e-mail terminal 20. Alternatively, a hardwired interface could be provided via an appropriate electrical connector provided in the vehicle instrument panel, or some other interface may be provided. Furthermore, because of the mobile nature of vehicle 22, a wireless interface between the vehicle PIM system 22 and the TCP/IP network 28 is to be preferred. One possibility for establishing an interface between the vehicle mounted PIM 22 and the TCP/IP network 28 is through a publicly accessible wireless network such as that provided by Wi-Fi network hub 30. In this case, the vehicle merely needs to be in the vicinity of a Wi-Fi "hot-spot" open to the public in order to gain access to the TCP/IP network 28. Another alternative is to establish a dial-up connection to an internet gateway device such as the TCP/IP gateway device 26 through the user's cell phone 16. In the case of a dial up connection through the cell phone 16, the vehicle PIM system 22 may be configured to control the cell phone 16 via a Bluetooth wireless interface or some other interface that allows the PIM 22 to control and communicate over the cell phone 16. According to this access mechanism, the vehicle mounted PIM system 22 causes the cell phone 16 to call the appropriate internet gateway 26. The gateway 26 provides a connection to the TCP/IP network 28 through which the vehicle PIM system 22 may access the synchronization server 24, and the through the synchronization server 24 synchronize the data stored on the user's home and work computers 12, 14, as well as any other devices the user may have that are accessible through the TCP/IP network 28.

The interfaces described above are just representative examples. Any other practicable interface may be substituted between the vehicle PIM 22 and the user devices including the cell phone 16, the PDA 18, the wireless email terminal 20, and the home or work computers 12, 14.

Figure 5:
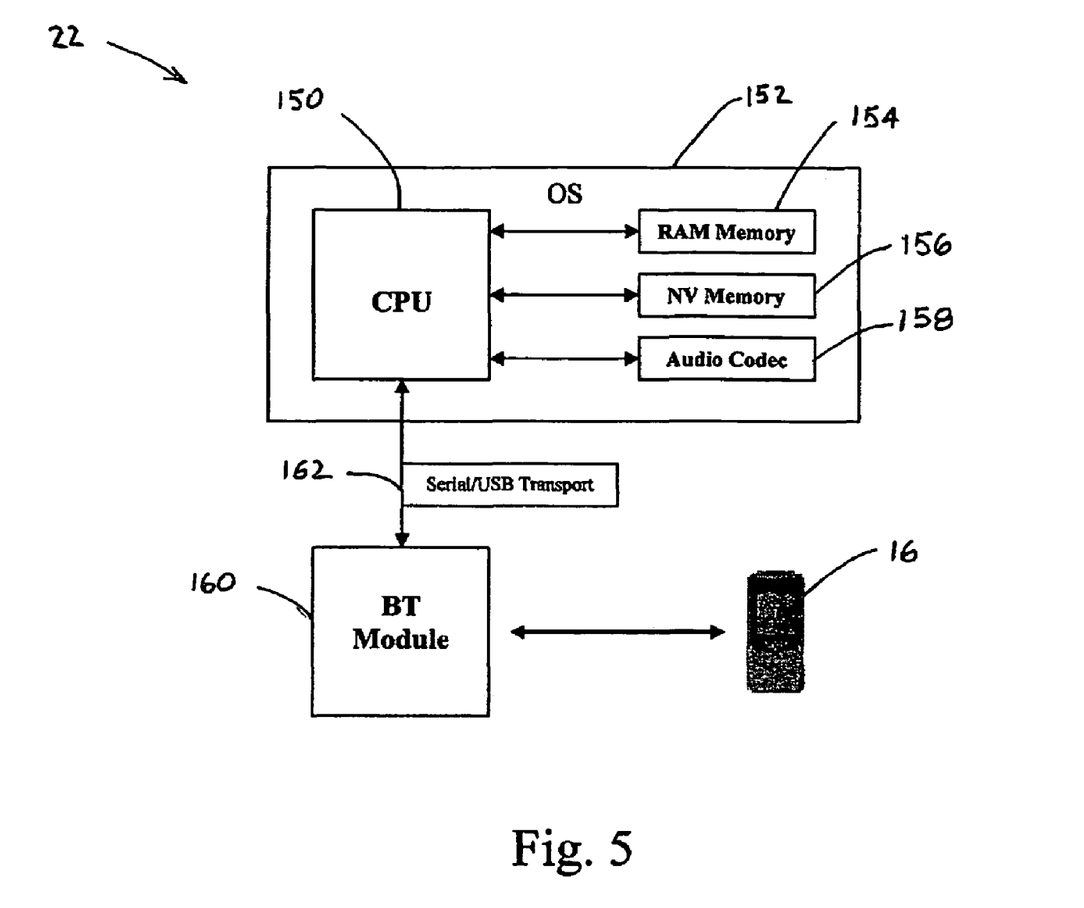
FIG. 5 is a block diagram of a PIM system including a synchronization arbitrator according to the present invention.

FIG. 5 is a block diagram of a personal information management system such as the PIM 22 of FIG. 1. According to an embodiment of the invention, the PIM 22 includes a central processing unit 150, a random access memory 154, a nonvolatile memory 156, and an audio codec 158. Together the CPU 150, the RAM memory 154, the nonvolatile memory 156, and the audio codec (optional) 158 comprise the PIM 22 operating system 152. The operating system 152 stores and executes the software instructions that allow the PIM 22 to perform its desired function, including receiving storing and displaying user data. The CPU 150 also executes the instructions comprising the synchronization arbitrator. The CPU 150 communicates with a Bluetooth communication module 160 via CPU 150 to communicate with and control external devices such as the cell phone 16, or other hand-held devices. A separate module such as a Wi-Fi module may also be provided to allow the CPU to access a TCP/IP network over a direct wireless connection to the TCP/IP network.

Before the data stored on the various devices can be synchronized, the synchronization arbitrator associated with the PIM 22 must learn the identity of each device with which it must synchronize data, and the proper synchronization protocol to use when synchronizing the data stored in each device. Identifying the devices and identifying the appropriate synchronization protocols may be accomplished through a one time registration process in which each device in the user's device universe is introduced to the synchronization arbitrator and the synchronization arbitrator interrogates each device to determine which synchronization protocols the individual devices support. The synchronization arbitrator stores the identity of each device along with the identity of the synchronization protocol appropriate for syncing with each particular device so that when it is time to individually synchronize each device, the synchronization arbitrator will know which devices to synchronize with and which protocols to use during the synchronization process.

In the embodiment shown in FIG. 1, the synchronization arbitrator is integrated with the vehicle PIM 22. Therefore, the PIM 22 need not be registered with the synchronization arbitrator. All other devices, however, including the cell phone 16, the PDA 18, the wireless e-mail terminal 20, the user's home computer 12, and the user's work computer 14 must all be registered with the synchronization arbitrator. Furthermore, because the synchronization server 24 plays an intermediary role in synchronizing data between the PIM 22 and the user's home and work computers 12, 14, the synchronization server 24 must also be registered with the synchronization arbitrator. Depending on the method employed for accessing the TCP/IP network, the gateway 26 may need to be registered as well.

In addition to identifying each device, the registration process must also identify the interface by which the synchronization arbitrator is to communicate with the various devices. For example, hand-held portable devices may be accessed directly via a Bluetooth wireless link. In order to access the home and work computers 12, 14 somewhat more effort and more information is required. In the embodiment shown in FIG. 1, both the user's home computer 12 and the user's work computer 14 synchronize with the synchronization server 24. When changes are made to personal data stored on either the home or work computers 12, 14, the computer on which the changes are made initiates a synchronization process with the synchronization server 24 over the TCP/IP network 28 using the SyncML Remote protocol. Any changes to the personal data stored on the sync server 24 are propagated to the other of the user's home computer 12 or work computer 14 the next time the other computer is synchronized with the synchronization server 24. The synchronization arbitrator associated with the PIM 22 does not necessarily synchronize directly with the home and work computers 12, 14, but rather with the synchronization server 24. Thus, in this case it is the synchronization server 24 that must be registered with the synchronization arbitrator not necessarily the home or work computers 12, 14 themselves. Registering the synchronization server 24 with the synchronization arbitrator requires making the synchronization arbitrator aware that it must sync with the sync server 24, and providing the necessary information to allow the synchronization arbitrator to communicate with the synchronization server 24 and identifying which synchronization protocol to use when synchronizing with the synchronization server 24. As described above, the sync arbitrator may access the sync server 24 a number of different ways, including accessing the TCP/IP network 28 directly through a wireless Wi-Fi network hub 30 or some other wireless network access medium. In this case, the synchronization arbitrator needs only to know the URL of the synchronization server 24 responsible for synchronizing with the user's home and work computers 12, 14 in order to establish a TCP/IP communication session with the synchronization server 24. The synchronization arbitrator may then synchronize data with the internet synchronization server 24 using TCP/IP Point-to-Point Protocol or some other protocol.

Alternatively, the sync arbitrator may access the TCP/IP network 28 via a dial-up connection through the user's cell phone 16. In this case the sync arbitrator must have all of the information necessary to establish a telephonic connection with the gateway 26 and to establish a TCP/IP communication with the synchronization server 24. Thus, the synchronization arbitrator must know both the telephone number for accessing the gateway 26 and the URL of the synchronization server 24. The synchronization arbitrator must also know how to make the connection with the gateway 26 through the user's cell phone 16, for example over the Bluetooth communication transport.

Figure 2:
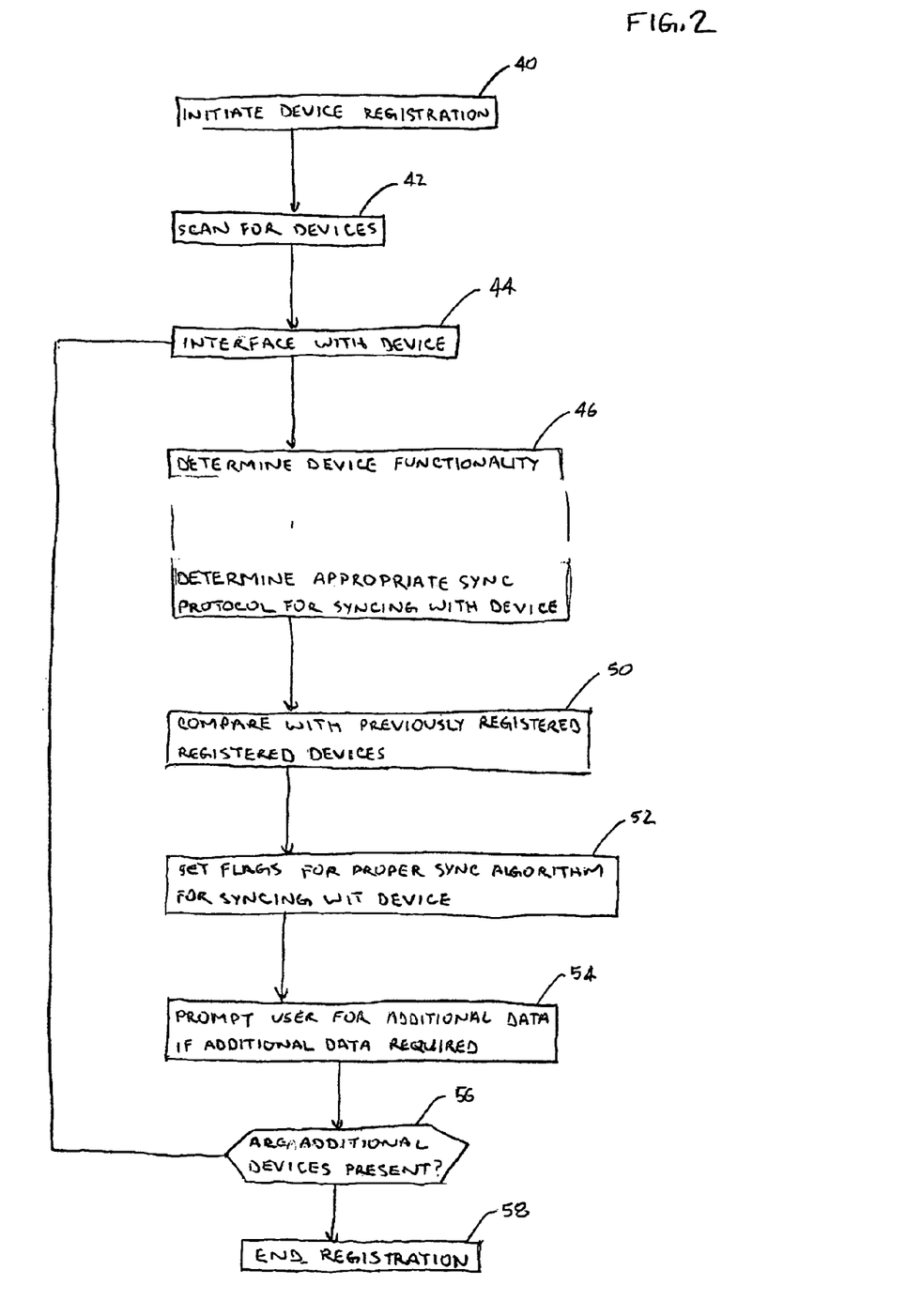
FIG. 2 is a flowchart illustrating a process of registering devices with a synchronization arbitrator.

FIG. 2 shows a flowchart of a device registration process according to an embodiment of the invention. According to this embodiment a user initiates a registration process at 40 by making a selection on an interface associated with the PIM 22. The PIM 22 scans for the presence of Bluetooth enabled devices. All Bluetooth enabled devices in range of the PIM 22 are identified and may be displayed to the user via an appropriate interface. The user may then select which of the displayed devices are to be registered with the synchronization arbitrator. Once the synchronization arbitrator has determined which devices must be registered, it causes the PIM 22 to connect to the specified device via the appropriate interface (e.g. Bluetooth for hand held portable devices) at 44. The synchronization arbitrator interrogates the device at 45 to determine its functionality and to determine which synchronization protocols the device supports and which protocol is the most appropriate for synchronizing data between the device and the PIM 22. At 50 the sync arbitrator compares the new device with existing devices already registered to determine whether any of the detected devices have been previously registered. Only devices that have not previously been registered are registered during any subsequent registration operation. Next, at 52 the synchronization arbitrator sets internal flags identifying the various protocols to be used for synchronizing data between the PIM 22 and the various registered devices. Finally, the synchronization arbitrator prompts the user at 54 for any additional information that may be required to sync with the particular device being registered. For example, if the synchronization server 24 is the device being registered and the connection route extends through the user's cell phone 16 and the ISP gateway 26, the synchronization arbitrator may prompt the user for the telephone number for accessing the internet gateway 26 and the URL of the internet sync server 24. If the PIM 22 accesses the TCP/IP network 28 via a Wi-Fi or other wireless network, the synchronization server URL may be the only additional information necessary. At 56 a determination is made whether there are additional devices present that must be registered. If there are, the process returns to 44 and the next device is registered. If not, the registration procedure ends at 58. Once all of the devices have been registered the personal data stored on each device may be synchronized with the data stored on each of the others.

Figure 3:
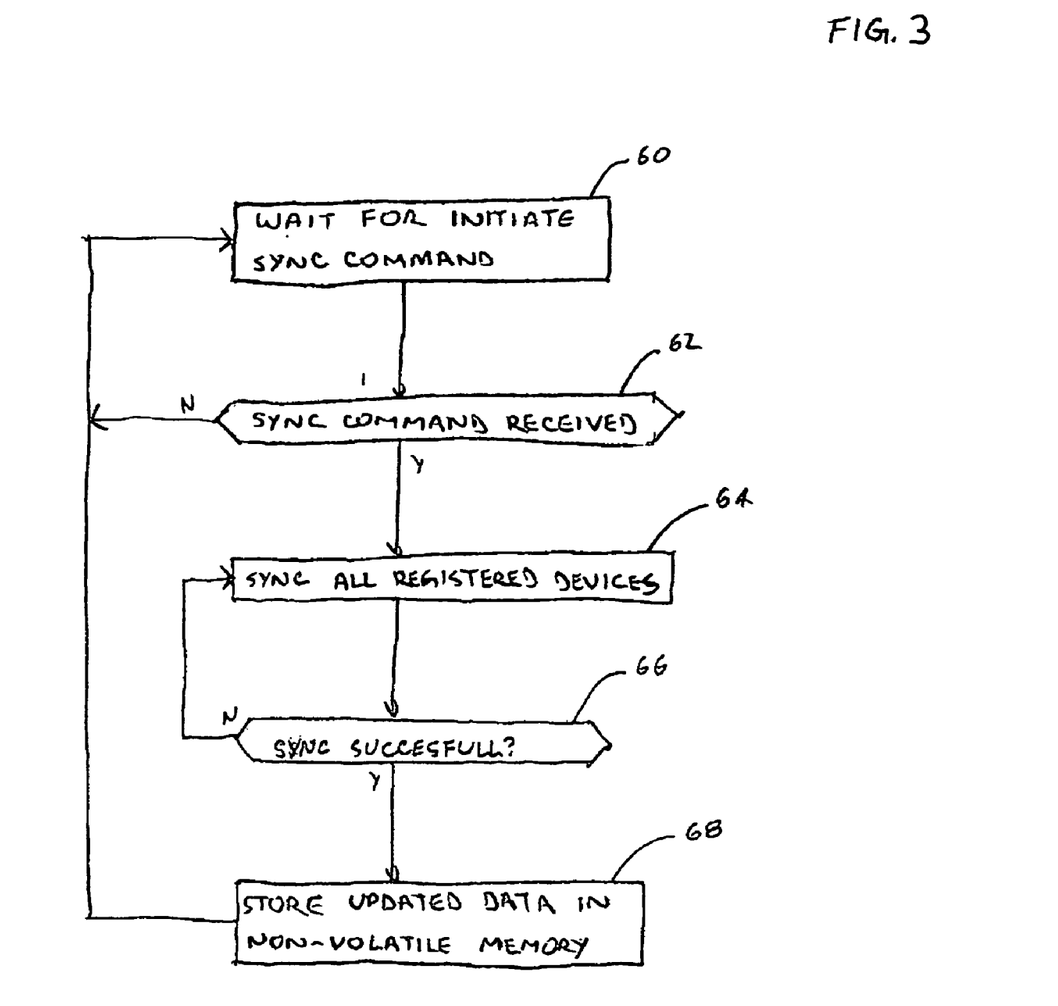
FIG. 3 is a flowchart showing an overview of a data synchronization procedure according to the present invention.

FIG. 3 shows a simplified flowchart of the data synchronization procedure. The data synchronization process begins at 60 where the sync arbitrator waits for a Sync Data command to be entered by the user. Such a command may be included as an input provided by the PIM 22 interface. For example, a touch screen "Initiate Data Sync" soft button or some other input may be provided as part of the PIM system's visual display. Alternatively, a hands free speech recognition interface may respond to a verbal Sync Data command, or the like. If the Sync Data command is received at 62 the process begins to synchronize the various devices at 64. If not, the process returns to 60 where the synchronization arbitrator continues to wait for the Sync Data command. Once the Sync Data command is received, the sync arbitrator synchronizes the data of all registered devices at 64. For each device the sync arbitrator employs the synchronization protocol identified when the device was registered to synchronize with the device. After synchronizing with each device the synchronization arbitrator determines whether the data sync was successful. If not, the process returns to 64 and all registered devices are synchronized again. If the synchronization arbitrator determines at 66 that synchronization was in fact successful, the synchronization arbitrator stores updated information in the PIM's 22 non-volatile memory. It is assumed that the external devices with which the PIM 22 is synchronizing stored any new or altered data as well.

Figure 4A:
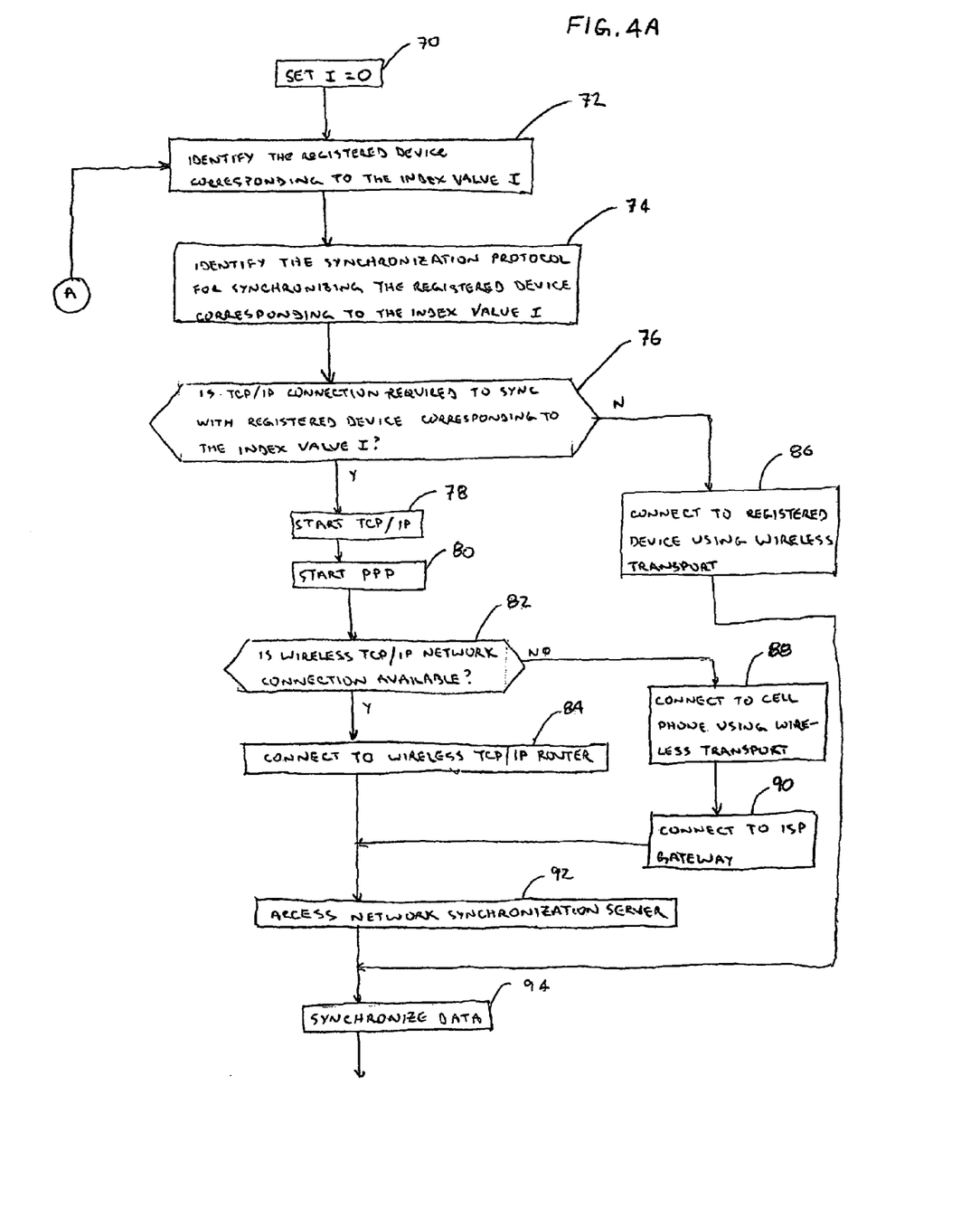
FIGS. 4A and 4B are a detailed flowchart showing a multiple device synchronization procedure according to the invention.
Figure 4B:
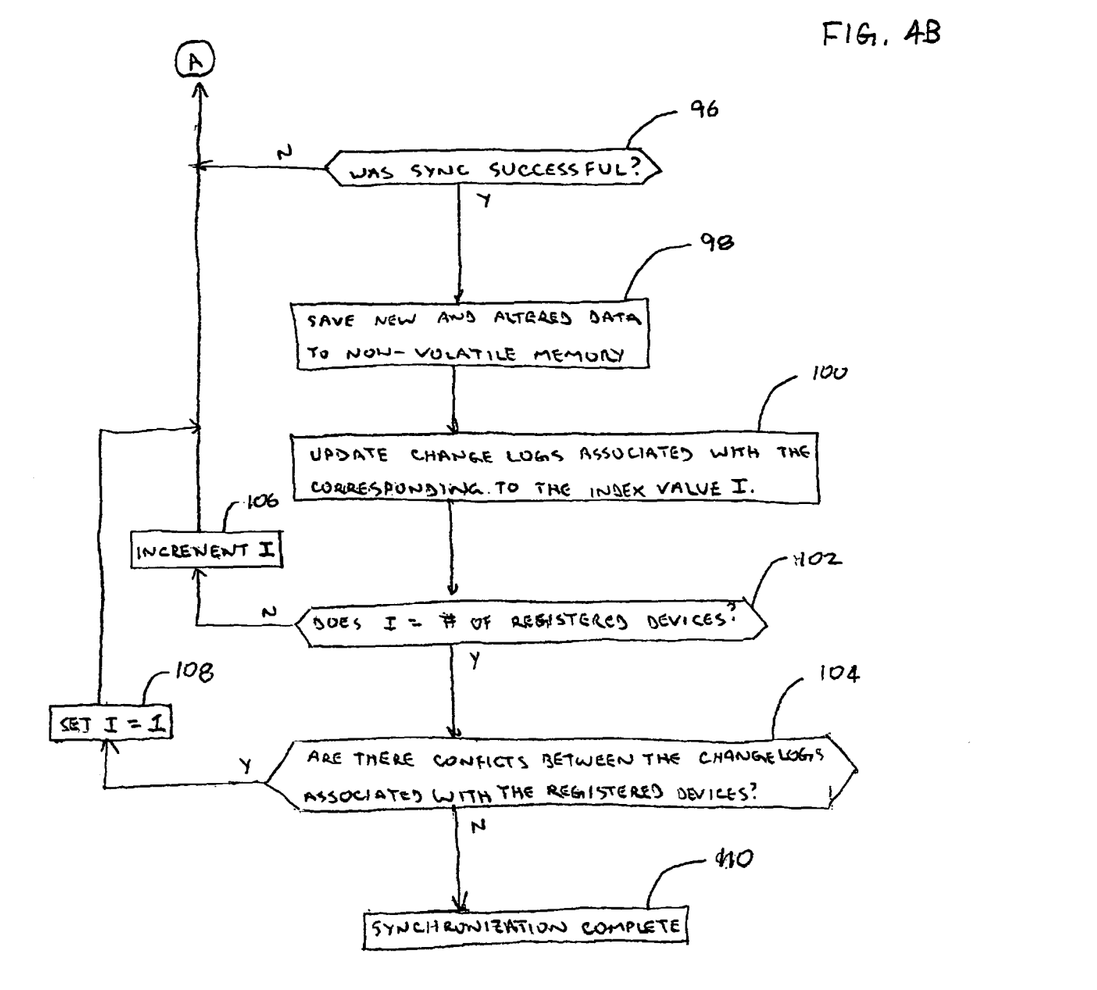

FIGS. 4A and 4B show a more detailed flow chart of the data synchronization process. First, an index variable I is initialized at 70 by setting I=1. At 72 the synchronization arbitrator identifies the registered device corresponding to the current value of the index. At 74 the synchronization arbitrator identifies the synchronization protocol that was determined to be the most appropriate for synchronizing with the device during the registration process and prepares to synchronize with the device using the identified synchronization protocol. At 76 the synchronization arbitrator determines whether a TCP/IP connection is required to synchronize the registered device corresponding to the current value of the index variable I. If a TCP/IP connection is required the synchronization arbitrator starts the TCP/IP protocol at 78 and starts the Point-to-Point Protocol at 80. If a TCP/IP connection is not required to synchronize with the registered device, the synchronization arbitrator connects to the registered device at 86 using the appropriate interface (e.g. the Bluetooth transport). In this case, once the synchronization arbitrator has connected with the registered device, it begins data synchronization using the designated protocol at 94. In the case where a TCP/IP connection is required, however, additional intermediate steps are necessary. First, while the TCP/IP and PPP protocols are being initiated the synchronization arbitrator must determine what type of interface is available to access the TCP/IP network. At 82 the synchronization arbitrator determines whether a wireless TCP/IP network connection such as a Wi-Fi network is available. If so, the synchronization arbitrator causes the PIM 22 to connect to the wireless network directly at 84. If at 82 the synchronization server determines that a wireless network connection is not available, a connection via the user's cell phone must be established. In this case, the synchronization arbitrator causes the PIM 22 to connect to the user's cell phone at 88 using the appropriate wireless transport (e.g. Bluetooth). The synchronization arbitrator further causes the user's cell phone to place a cellular telephone call to a designated internet gateway associated with the user's internet service provider (ISP). Once the cellular telephone call is connected to the ISP's gateway at 90, or after the PIM 22 has connected directly to a wireless TCP/IP network router at 84, the PIM 22 may access the synchronization server 24 over the TCP/IP network at 92 by directing a query to the synchronization server's URL. Once the TCP/IP session with the synchronization server 24 has been established or once the PIM 22 has connected with one of the hand held devices, data synchronization between the PIM 22 and the registered device begins at 94.

Moving on to the remainder of the flow chart shown in FIG. 4B, the synchronization arbitrator determines at 96 whether the data synchronization with the registered device was successful. If not, the process flow returns to 72 where the synchronization arbitrator again attempts to synchronize data between the PIM 22 and the registered device corresponding to the current value of the index variable I. This process may be repeated indefinitely until a successful synchronization is detected, or a time-out counter or timer may be used in order to generate an error message after several attempts to synchronize with a particular device have failed or after too much time has passed without a successful synchronization. If the data synchronization is successful the PIM 22 stores new data received from the registered device in non-volatile memory at 98, and the registered device does the same with data received from the PIM system. Next, at 100, the synchronization arbitrator updates change logs associated with the registered device corresponding to the current value of the index variable I. Once the change logs have been updated, the synchronization arbitrator determines whether the current value of the index variable I equals the total number of registered devices at 102. If not, the current value of the index variable I is incremented at 106 and the process returns to 72 where the data synchronization process begins anew for the next registered device. Otherwise, if the current valued of the index variable I does in fact equal the total number of registered devices, indicating the PIM system 22 has been synchronized with all of the registered devices, the change logs updated during the data synchronization with each registered device are compared at 104.

The change logs are compared in order to determine whether additional data synchronizations are necessary to ensure that all of the user data stored on all of the various registered devices is consistent across all of the devices. This is required because the PIM system 22 synchronizes data with each registered device sequentially rather than synchronizing with each device simultaneously. If changes are made to the data stored on the PIM system 22 as a result of synchronizing with the last device, these changes will not be reflected on all of the earlier synchronized devices. If discrepancies in the change logs are found at 104, indicating that additional synchronization is necessary, the index variable I is reset to 1 and the process returns to 72 where the entire synchronization process begins again. However, this time through the synchronization process the changes in the data stored on the PIM 22 resulting from synchronizing with the later devices synchronized the first time through the process will be propagated to the devices that are synchronized earlier in the process. Thus, when the PIM system 22 re-synchronizes with the devices the second time, the data across all of the registered devices will be consistent. After the second pass through the synchronization process, comparing the change logs at 104 will indicate that there are no inconsistencies in the data stored on any of the registered devices or on the PIM system 22. At this point the synchronization process ends at 110. The synchronization arbitrator then waits for the next Sync Data command to be entered by the user.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A system for managing data synchronization among a plurality of data storage devices, the system comprising:
   a personal information management (PIM) system adapted to interface with a plurality of data storage devices, the personal information system supporting a plurality of data synchronization protocols for synchronizing data with said plurality of data storage devices; and
   a synchronization arbitrator associated with the personal information system, the synchronization arbitrator adapted to register one or more data storage devices and initiate a data synchronization function between each registered data storage device and the personal information system using a synchronization function appropriate for each data storage device,
   wherein the synchronization arbitrator is adapted to maintain a change log for each registered data storage device and compare the change logs to determine whether changes necessary to synchronize the synchronization arbitrator and one of the registered devices are necessary to synchronize the synchronization arbitrator and another of the registered devices, and
   wherein the synchronization arbitrator increments an index variable when each change log is updated and the synchronization arbitrator compares the change logs when the index variable equals a total number of the registered data storage devices.

2. The system of claim 1 wherein the PIM system supports data synchronization protocols including at least one of: SYNCML over a remote data protocol; SYNCML over a local data protocol; IRMC; Bluetooth Phonebook Access (PBAP); and AT command-based information retrieval.

3. The system of claim 2, wherein the remote data protocol comprises TCP/IP.

4. The system of claim 2, wherein the local data protocol comprises Bluetooth.

5. The system of claim 1, wherein registering one or more data storage devices comprises identifying a data storage device and identifying an appropriate synchronization protocol for performing data synchronization with the device, and storing a device identifier and an associated synchronization protocol identifier.

6. The system of claim 5, wherein the synchronization arbitrator is adapted to initiate a data synchronization function with a registered device employing a synchronization protocol corresponding to the synchronization protocol identifier stored in association with a stored device identifier.

7. A personal information management system comprising:
   a vehicle mounted personal data storage system;
   a hand-held personal data storage device;
   a computer adapted to store personal data; and
   a synchronization arbitrator adapted to maintain consistent personal data stored in the vehicle mounted personal data storage system, the hand-held personal storage system and the computer,
   wherein the synchronization arbitrator is adapted to maintain a first change log for the hand-held personal data storage device and a second change log for the computer and compare the first and second change logs to determine whether changes necessary to synchronize the synchronization arbitrator and the hand-held personal data storage device are necessary to synchronize the synchronization arbitrator and the computer, and
   wherein the synchronization arbitrator increments an index variable when the each of the first and the second change log is updated and the synchronization arbitrator compares the first and the second change logs when the index variable equals a total number of the hand-held personal data storage device and the computer.

8. The personal information management system of claim 7, wherein the synchronization arbitrator is adapted to sequentially synchronize data between the hand-held device and the vehicle mounted personal data system and between the computer and the vehicle mounted personal data system to ensure that personal data stored in each location remains consistent.

9. The personal information management system of claim 7, wherein the hand-held personal data storage device includes wireless telephone functionality, and the system further comprises a wireless interface between the synchronization arbitrator and the hand-held mobile device allowing the synchronization arbitrator to communicate with and control the hand held mobile device.

10. The personal information management system of claim 9, wherein the wireless interface between the synchronization arbitrator and the hand-held mobile device comprises a Bluetooth wireless link.

11. The personal information system of claim 10, wherein the synchronization arbitrator is adapted to place a wireless telephone call to an internet service provider internet gateway via the hand held mobile device whereby the synchronization arbitrator may synchronize personal data with a synchronization server using TCP/IP and PPP network protocols.

12. A method of maintaining consistent data across a plurality of personal data storage devices, comprising:
   providing a synchronization arbitrator adapted to synchronize personal data among each of a plurality user devices storing personal data;
   synchronizing data between the synchronization arbitrator and a first device such that personal data stored on both the first device and the synchronizing arbitrator are consistent;
   maintaining a first change log of changes necessary to synchronize the personal data between the synchronization arbitrator and the first device;
   synchronizing data between the synchronization arbitrator and a second device such that personal data stored on both the second device and the synchronization arbitrator are consistent;
   maintaining a second change log of changes necessary to synchronize the personal data between the synchronization arbitrator and the second device;
   incrementing an index variable when each of the first and the second change log is updated;
   comparing the first and second change logs to determine whether changes necessary to synchronize the personal data between the synchronization arbitrator and the second device are necessary to synchronize the personal data between the synchronization arbitrator and the first device when the index variable equals a total number of the first device and the second device; and
   synchronizing data between the synchronization arbitrator and the first device when it is determined that changes necessary to synchronize the personal data between the synchronization arbitrator and the second device are necessary to synchronize data between the synchronization arbitrator and the first device.

13. The method of maintaining consistent data across a plurality of personal data storage devices of claim 12 further comprising registering each of the plurality of personal data storage devices with the synchronization arbitrator, the synchronization arbitrator maintaining a record of each registered device with which it must synchronize personal data and an appropriate synchronization protocol for synchronizing data with each device.

14. The method of maintaining consistent data across a plurality of personal data storage devices of claim 13, wherein a synchronization protocol for synchronizing personal data between the synchronization arbitrator and at least one of the personal data storage devices is selected from the group comprising: SYNCML over remote data protocol; SYNCML over a local data protocol; IRMC remote Sync; IRMC local SYNC; Bluetooth Phonebook Access; and AT command-based information retrieval.

15. The method of maintaining consistent data across a plurality of personal data storage devices of claim 14, wherein the remote data protocol comprises TCP/IP.

16. The method of maintaining consistent data across a plurality of personal data storage devices of claim 14, wherein the local data protocol comprises Bluetooth.

17. The method of maintaining consistent data across a plurality of personal data storage devices of claim 12, wherein said plurality of personal data storage devices comprises at least one of a cellular telephone; a personal digital assistant; a wireless email terminal; a hybrid device and a computer.

18. The method of maintaining consistent data across a plurality of personal data storage devices of claim 12, wherein said plurality of personal data storage devices comprises at least two of a cellular telephone; a personal digital assistant; a wireless email terminal; a hybrid device and a computer.

19. The method of maintaining consistent data across a plurality of personal data storage devices of claim 18, wherein the plurality of personal data storage devices includes a mobile telephone and a computer connected to a packet switched network supporting TCP/IP communication.

20. The method of maintaining consistent data across a plurality of personal data storage devices of claim 19, wherein the wireless interface between the synchronization arbitrator and the computer comprises a WI-FI wireless network interface.

21. The method of maintaining consistent data across a plurality of personal data storage devices of claim 18, further comprising establishing a wireless interface between the synchronization arbitrator and the mobile telephone so that the synchronization arbitrator may control and communicate over the mobile phone; and the synchronization arbitrator establishing a telephone link to the packet switched network through the mobile telephone whereby the synchronization arbitrator accesses a synchronization server adapted to synchronize the personal data between the computer and the synchronization arbitrator.

22. A method of maintaining consistent personal data across a plurality of devices adapted to store personal data, the method comprising:

providing a synchronization arbitrator;

registering a plurality of devices storing personal data with the synchronization arbitrator;

identifying a synchronization protocol for synchronizing data between the synchronization arbitrator and each of the plurality of registered devices;

synchronizing data between the synchronization arbitrator and each device of said plurality of devices, for each device using a synchronization protocol identified for synchronizing data with the device, maintaining change logs documenting changes to personal data stored in the devices adapted to store user data and the synchronization arbitrator, incrementing an index variable when each change log is updated, and comparing change logs to determine whether changes to stored data resulting from the synchronization arbitrator synchronizing data with a first device adapted to store data are reflected in the personal data stored on a second device when the index variable equals a total number of the registered devices.

23. The method of maintaining consistent personal data across a plurality of devices adapted to store personal data of claim 22, wherein the plurality of devices includes at least one of a cell phone, a personal digital assistant, a wireless email terminal device, a hand held hybrid device combining the functions of a cell phone personal digital assistant or wireless email terminal, and a computer.

24. The method of maintaining consistent personal data across a plurality of on devices adapted to store personal data of claim 23, further comprising providing an interface between the synchronization arbitrator and each device of the plurality of devices.

25. The method of maintaining consistent personal data across a plurality of devices adapted to store personal data of claim 24, wherein the interface between the synchronization arbitrator and at least one device comprise a wireless communication link.

26. The method of maintaining consistent personal data across a plurality of devices adapted to store personal data of claim 25, wherein the wireless communication link comprises a Bluetooth link.

27. The method of maintaining consistent personal data across a plurality of devices adapted to store personal data of claim 25, wherein the wireless communication link comprises a WI-FL network interface.

28. The method of maintaining consistent personal data across a plurality of devices adapted to store personal data of claim 25, wherein the interface comprises a Bluetooth link between the synchronization arbitrator and a cell phone, wherein the synchronization arbitrator is adapted to control the cell phone via the Bluetooth connection to create a cellular telephone connection to an internet gateway, such that the synchronization server via the Bluetooth link, the cellular telephone connection, and the TCP/IP network.

29. The method of maintaining consistent personal data across a plurality of devices adapted to store personal data of claim 22, wherein registering a plurality of devices storing personal data comprises storing the identity of each device with which the synchronization arbitrator must synchronize data with the identity of the identified synchronization protocol for synchronizing data between the synchronization arbitrator with the device.

30. The method of maintaining consistent personal data across a plurality of devices adapted to store personal data of claim 22 further comprising, if based on the comparison of the change logs it is determined that the changes to the stored data resulting from the synchronization arbitrator synchronizing data with the first device are not reflected in the personal data stored in the second device, re-synchronizing the personal data between the synchronization arbitrator and the second device.

* * * * *